United States Patent [19]

Rogge et al.

[11] Patent Number: 5,078,276
[45] Date of Patent: Jan. 7, 1992

[54] BICYCLE HANGER

[75] Inventors: Gail E. Rogge, Hemet; Dennis G. Piper, San Diego, both of Calif.; Michael H. Young, Germantown, Tenn.

[73] Assignee: Troxel-West, San Diego, Calif.

[21] Appl. No.: 607,080

[22] Filed: Nov. 1, 1990

[51] Int. Cl.$^5$ .............................................. A47F 7/00
[52] U.S. Cl. ........................................ 211/18; 211/96; 248/290; 248/289.1
[58] Field of Search ........................... 211/96, 18, 17; 248/289.1, 290

[56] References Cited

U.S. PATENT DOCUMENTS

| 3,329,385 | 7/1967 | Dietsch | 211/96 X |
| 4,074,884 | 2/1978 | Antoszewski | 248/289.1 |
| 4,650,144 | 3/1987 | Conrad | 248/290 |

FOREIGN PATENT DOCUMENTS

| 14793 | of 1897 | United Kingdom | 211/18 |
| 24321 | of 1897 | United Kingdom | 211/18 |

Primary Examiner—Robert W. Gibson, Jr.
Attorney, Agent, or Firm—Baker, Maxham, Jester & Meador

[57] ABSTRACT

A collapsible bicycle storage device may include a bracket assembly including a mounting portion for mounting the bracket assembly to a wall or ceiling, and an arm support assembly for supporting one or more bicycle support arms in the bracket assembly. The arm support assembly supports an arm assembly having at least one bicycle support arm rotatably mounted in the bracket assembly for rotation between a stowage position and an operational position.

8 Claims, 2 Drawing Sheets

BICYCLE HANGER

BACKGROUND OF THE INVENTION

The present invention relates to a bicycle storage device, and more particularly, to a collapsible bicycle storage device for storing a bicycle in a garage, a dwelling or other structure.

Bicycle storage devices have been proposed for securing a bicycle in a garage, apartment or other structure or dwelling. Such devices are typically configured for selected mounting environments and may be adjustable to some degree.

A need exists, however, for an improved bicycle storage device which is compatible with a plurality of desired mounting locations or which may be operatively configured in accordance with a preferred mode of use.

SUMMARY OF THE INVENTION

It is therefore an object of the present invention to provide a bicycle storage device of novel and improved design. To that end, a collapsible bicycle storage device may include a bracket assembly including a mounting portion for mounting the bracket assembly to a wall or ceiling, and an arm support assembly for supporting one or more bicycle support arms in the bracket assembly. The arm support assembly supports an arm assembly having at least one bicycle support arm rotatably mounted in the bracket assembly for rotation between a stowage position and an operational position.

BRIEF DESCRIPTION OF THE DRAWING

The objects, features and advantages of the invention will be more readily appreciated when read in conjunction with the accompanying drawing in which.

DESCRIPTION OF THE PREFERRED EMBODIMENTS

Figure 1:
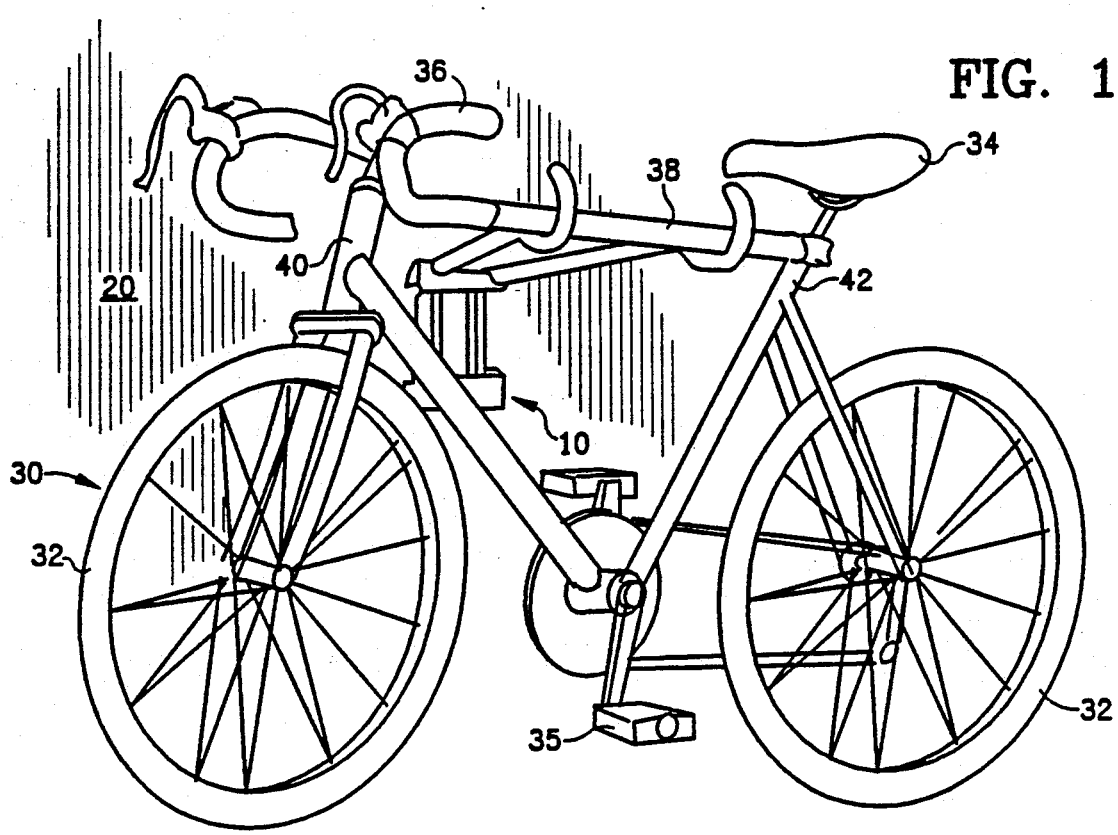
FIG. 1 is a diagrammatic perspective view of a bicycle carrier constructed in accordance with the present invention showing a bicycle mounted thereon.

Referring now to FIG. 1, a bicycle storage device 10 is shown mounted on a wall 20 of a garage, apartment or other structure. The bicycle storage device 10 supports a bicycle 30 having the usual wheels 32, seat 34, pedals 35 and handlebars 36. The bicycle is supported by an upper bar 38 thereof extending between a forward steering column support tube 40 and a seat post support tube 42.

Figure 2:
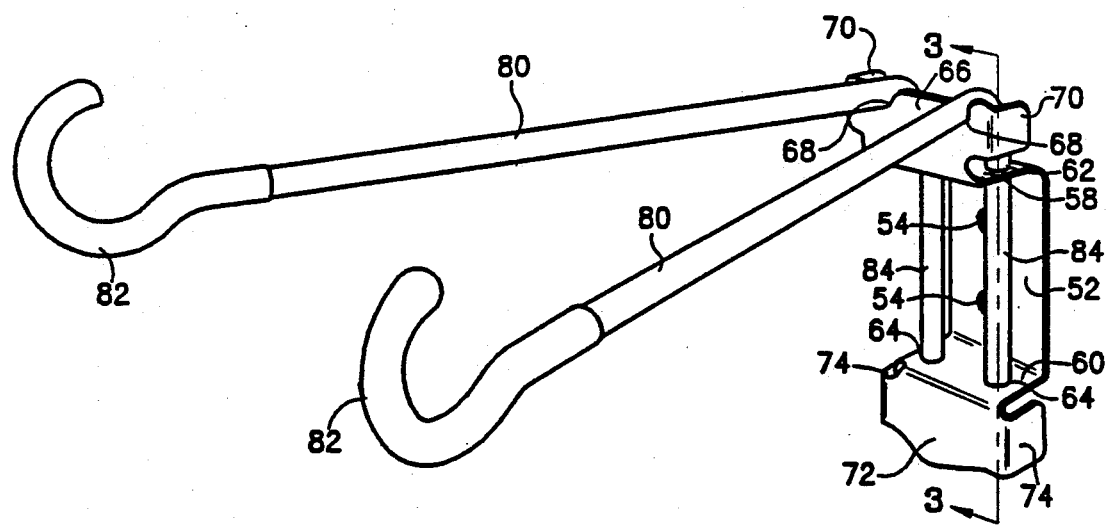
FIG. 2 is an exploded detailed perspective view of the bicycle carrier shown in FIG. 1.
Figure 4:
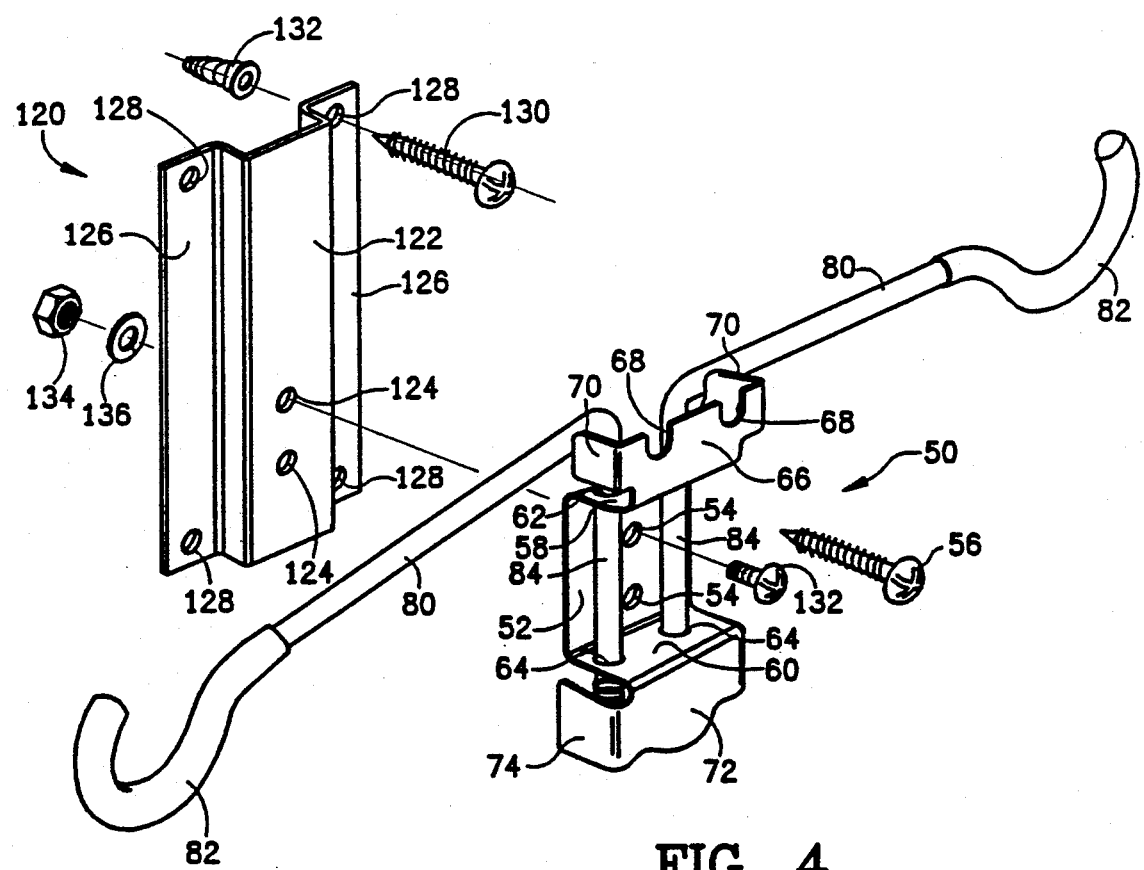
FIG. 4 is an exploded detailed perspective view of the bicycle carrier with a mounting channel.

Referring now to FIGS. 2 and 4, the bicycle support device 10 includes a rear mounting plate 52 having a pair of upper and lower holes 54 formed therein for receiving and supporting a pair of fasteners 56 for securement in a wall or ceiling. The bicycle support device 10 further includes a pair of upper and lower bicycle support arm mounting plates 58 and 60, respectively, which extend from the rear mounting plate 52 and are oriented generally perpendicularly with respect thereto. The upper and lower mounting plates 58 and 60 each include a pair of holes 62 and 64, respectively, formed therein. Each of the holes 62 on the upper mounting plate are aligned with the respective holes 64 on the lower mounting plate.

Extending upwardly from and generally perpendicularly to the upper mounting plate 58, is a positioning guide 66. The positioning guide 66 has a pair of notches 68 formed therein. Extending rearwardly from the positioning guide 66, and generally perpendicularly to the rear mounting plate 52, are a pair of positioning tabs 70.

Extending downwardly from and generally perpendicular to the lower mounting plate 60, is a lower cover element 72 having a pair of cover tabs 74 extending rearwardly and generally perpendicularly therefrom.

There are slideably and rotatably mounted in the bicycle support arm mounting plates, a pair of bicycle support arms 80. The support arms 80 extend generally parallel to the upper mounting plate 58 and each have disposed at one end thereof a bicycle hook support 82. The hook support 82 is preferably coated with a suitable protective covering such as plastic or rubber, to prevent damage to the exterior finish of the bicycle. The hook elements 82 preferably extend radially at least 180 degrees from the arms 80 such that the hook elements will properly support a bicycle should the support arms be oriented substantially vertically. The support arms each include at the opposite end thereof a stem element 84 which is slideably and rotatably mounted in the upper and lower mounting plate holes 62 and 64.

Figure 3:
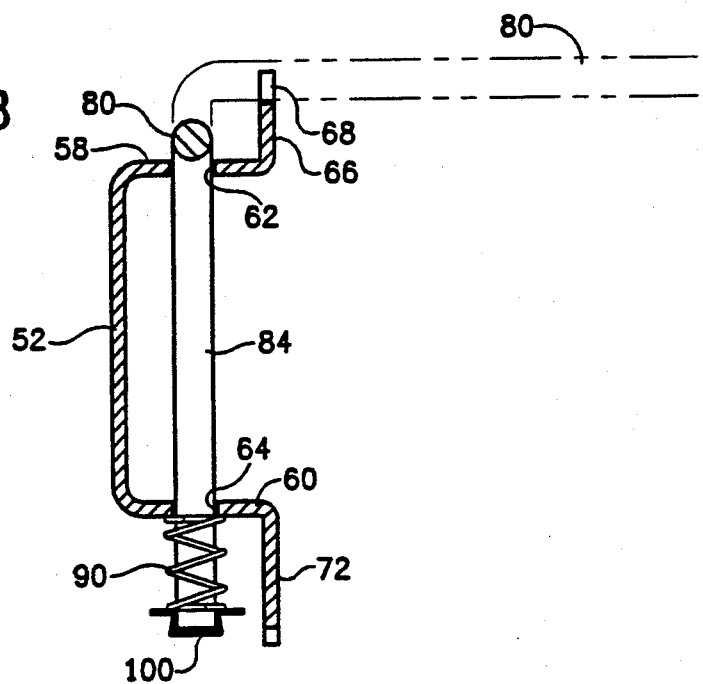
FIG. 3 is a cross-sectional side view taken along line 3—3 in FIG. 2.

As shown in FIGS. 2 and 4, the support arms 80 may be securely positioned in an operational position in the notches 68, or in a stowage position between the tabs 70 and the adjacent wall or ceiling. As shown in FIG. 3, the support arms 80 are resiliently biased toward the upper and lower mounting plates 58 and 60 by means of a helical compression spring 90 which is slideably disposed on the stem 84 below the lower mounting plate 60. The spring 90 is slideably retained on the stem 84 by means of a retaining cap 100. The support arms 80 are thus affirmatively positionable between operational and stowage positions by lifting the support arms above the top of the positioning guide 66 and rotating the support arms to the desired configuration.

Referring now to FIG. 4, the bicycle storage device 10 may be mounted to a wall stud in a ceiling or wall using the wood screw fasteners 56. Alternatively, the bicycle storage device 10 may be mounted on a wall board or plaster type wall using an optional mounting channel 120. The mounting channel 120 includes a central web 122 having a pair of upper and lower holes 124 therein spaced to align with the holes 54 of the rear mounting plate 52. The channel member 120 further includes a pair of side flanges 126 each having a pair of upper and lower holes 128 formed therein for receiving and supporting a fastener 130. The fastener 130 is threaded into a corresponding anchor 132 mounted in the adjacent wall. When the channel mounting bracket 120 is used in conjunction with the bicycle support device 10, a pair of bolt-type fasteners 132 are used in conjunction with a pair of receiving nuts 134 and lock washers 136.

Thus, a novel bicycle storage device has been disclosed. While several preferred embodiments have been shown and described, it should be understood that modifications and adaptations thereof will occur to persons skilled in the art. Therefore, the protection afforded the invention should not be limited except in accordance with the spirit of the appended claims and their equivalents.

We claim:
1. A collapsible bicycle storage device comprising:
a bracket assembly including a mounting portion for mounting said bracket assembly to a wall or ceiling, and an arm support assembly for supporting one or more bicycle support arms in said bracket assembly;
at least one bicycle support arm rotatably mounted in said bracket assembly for rotation between a stowage position and an operational position; and
wherein said bracket assembly mounting portion includes a rear mounting plate having a pair of mounting holes therein, and a channel section having a central web and a pair of lateral mounting flanges, said central web having a pair of holes therein for receiving and supporting a pair of fasteners extending through said plate and said web, said mounting flanges having upper and lower pairs of mounting holes therein for receiving and supporting upper and lower pairs of fasteners for securement in a support surface.

2. A collapsible bicycle storage device comprising:
a bracket assembly including a mounting poriton for mounting said bracket assembly to a wall or ceiling, and an arm support assembly for supporting one or more bicycle support arms in said bracket assembly;
at least one bicycle support arm rotatably mounted in said bracket assembly for rotation between a stowage position and an operational position; and
wherein said bracket assembly includes a rear mounting plate for mounting to a support surface and a pair of upper and lower bicycle support arm mounting plates extending generally perpendicularly to said rear mounting plate, said upper and lower bicycle support arm mounting plates each including a pair of apertures therein for slideably receiving and rotatably supporting said bicycle support arms, and wherein said bicycle support arms each extend generally parallel to said bicycle support arm mounting plate and include a bicycle support hook at one end and a mounting stem at another end extending generally perpendicularly to said upper and lower bicycle support arm mounting plates, said stem being slideably and rotatably mounted in said upper and lower bicycle support arm mounting plate holes.

3. A collapsible bicycle storage device comprising:
a bracket assembly including a mounting portion for mounting said bracket assembly to a wall or ceiling, and an arm support assembly for supporting one or more bicycle support arms in said bracket assembly;
at least one bicycle support arm rotatably mounted in said bracket assembly for rotation between a stowage position and an operational position; and
wherein said bracket assembly includes a rear mounting plate for mounting to a support surface and a pair of upper and lower bicycle support arm mounting plates extending generally perpendicularly to said rear mounting plate, said upper and lower bicycle support arm mounting plates, each including a pair of apertures therein for slideably receiving and rotatably supporting said bicycle support arms, and wherein said bicycle support arms each extend generally parallel to said bicycle support arm mounting plates and include a bicycle support hook at one end and a mounting stem at another end extending generally perpendicularly to said upper and lower bicycle support arm mounting plates, said stem being slideably and rotatably mounted in said upper and lower bicycle support arm mounting plate holes, and wherein said upper bicycle support arm mounting plate has mounted thereon a bicycle support arm mounting guide extending generally perpendicularly to said upper bicycle support arm mounting plate, said bicycle support arm mounting guide including a pair of notches for receiving and supporting said bicycle support arms in a defined operational position, and a pair of tabs extending generally perpendicularly to said rear mounting plate for supporting said bicycle support arms in a stowage position between said tabs and an adjacent support surface to which the bicycle carrier is to be mounted.

4. A collapsible bicycle storage device comprising:
a bracket assembly including a mounting portion for mounting said bracket assembly to a wall or ceiling, and an arm support assembly for supporting one or more bicycle support arms in said bracket assembly;
at least one bicycle support arm rotatably mounted in said bracket assembly for rotation between a stowage position and an operational position; and
wherein said bracket assembly includes a rear mounting plate for mounting to a support surface and a pair of upper and lower bicycle support arm mounting plates extending generally perpendicularly to said rear mounting plate, said upper and lower bicycle support arm mounting plates each including a pair of apertures therein for slideably receiving and rotatably supporting the bicycle support arms, and wherein said bicycle support arms each extend generally parallel to said bicycle support arm mounting plates and include a bicycle support hook at one end and a mounting stem at another end extending generally perpendicularly to said upper and lower bicycle support arm mounting plates, said stem being slideably and rotatably mounted in said upper and lower bicycle support arm mounting plate holes, and wherein said upper bicycle support arm mounting plate has mounted therein a bicycle support arm mounting guide extending generally perpendicularly to said upper bicycle support arm mounting plate, said bicycle support arm mounting guide including a pair of notches for receiving and supporting said bicycle support arms in a defined operational position, and a pair of tabs extending generally perpendicularly to said rear mounting plate for supporting said bicycle support arms in a stowage position between said tabs and an adjacent support surface to which the bicycle carrier is to be mounted, and wherein said bicycle support arms further include a biasing spring slideably mounted on said bicycle support arm stem below said lower bicycle support arm mounting plate, and a retaining cap mounted on the end of said bicycle support arm step to slideably retain said biasing spring between said retaining cap and said lower bicycle support arm mounting plate.

5. A bicycle storage device comprising:
a bracket assembly including a mounting portion for mounting said bracket assembly to a wall, and an arm support assembly for supporting one or more bicycle support arms in said bracket assembly;

an arm assembly having at least one bicycle support arm rotatably mounted in said bracket assembly for rotation between a defined stowage position and a defined operational position; and said bicycle storage device further including means for securing said arm assembly in a stowage or operational position.

6. A bicycle storage device comprising:

a bracket assembly including a mounting portion for mounting said bracket assembly to a wall, and an arm support assembly for supporting one or more bicycle support arms i said bracket assembly;

an arm assembly having at least one bicycle support arm rotatably mounted in said bracket assembly for rotation between a defined stowage position and a defined operational position; and wherein said bracket assembly includes a pair of notches for securing said arm assembly in an operational position.

7. A bicycle storage device comprising:

a bracket assembly including a mounting portion for mounting said bracket assembly to a wall, and an arm support assembly for supporting one or more bicycle support arms in said bracket assembly;

an arm assembly having at least one bicycle support arm rotatably mounted in said bracket assembly for rotation between a defined stowage position and a defined operational position; and wherein said bracket assembly includes a pair of notches for securing said arm assembly in an operational position, and pair of retaining tabs for securing said arm assembly in a stowage position.

8. A bicycle storage device comprising:

a bracket assembly including a mounting portion for mounting said bracket assembly to a wall, and an arm support assembly for supporting one or more bicycle support arms in said bracket assembly;

an arm assembly having at least one bicycle support arm rotatably mounted in said bracket assembly for rotation between a defined stowage position and a defined operational position; and wherein said bracket assembly includes a pair of notches for securing said arm assembly in an operation position, and a pair of rotating tabs for securing said arm assembly in a stowage position, and wherein said arm assembly is translationally and rotatably positionable for movement in and out of said stowage for operational positions.

* * * * *